Dec. 17, 1963   J. E. SMITH, JR   3,114,296
LINEAR ACTUATOR
Filed March 23, 1961   4 Sheets-Sheet 1
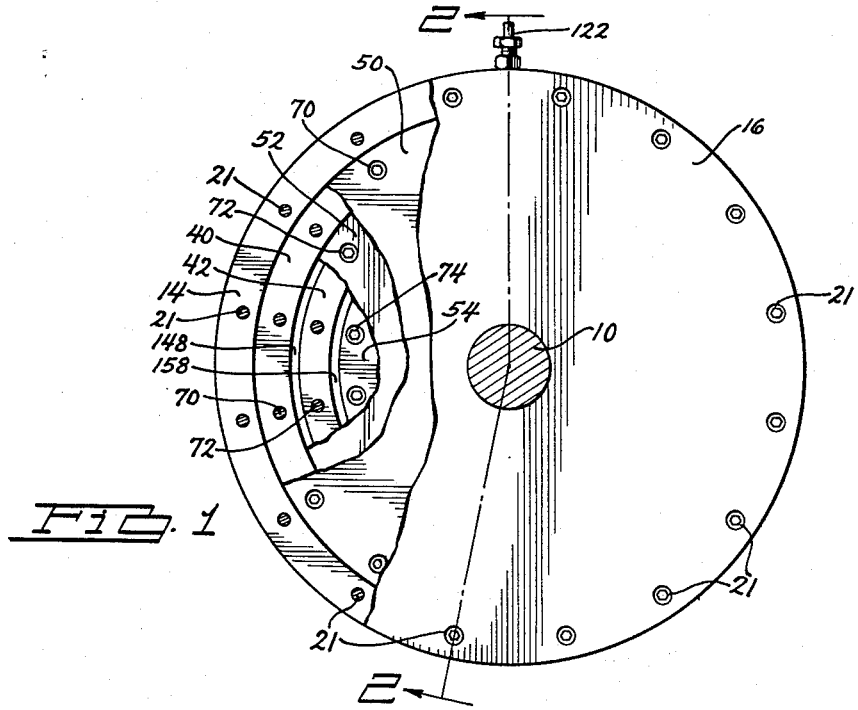
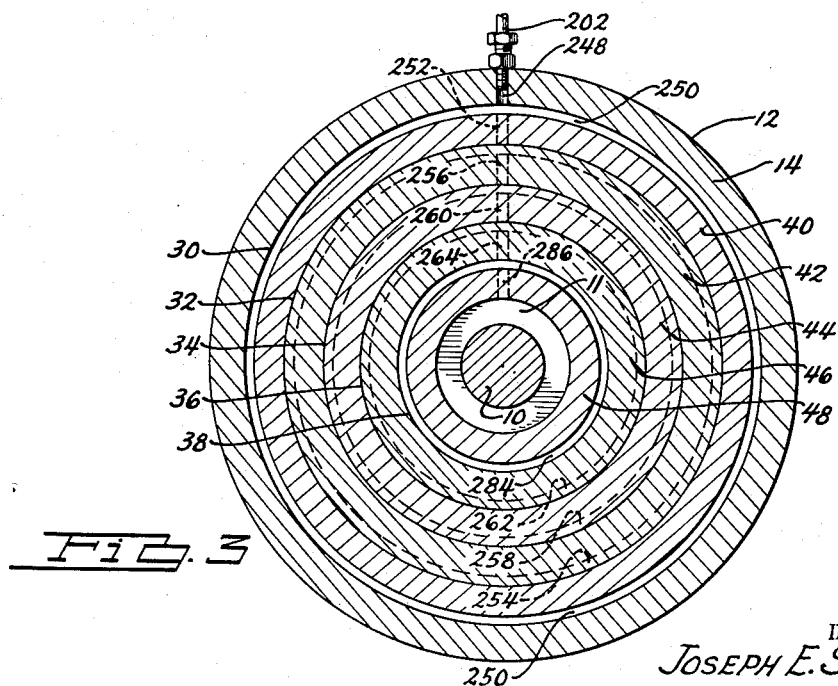
INVENTOR.
JOSEPH E. SMITH JR.
BY
Bower & Patalidis
ATTORNEYS

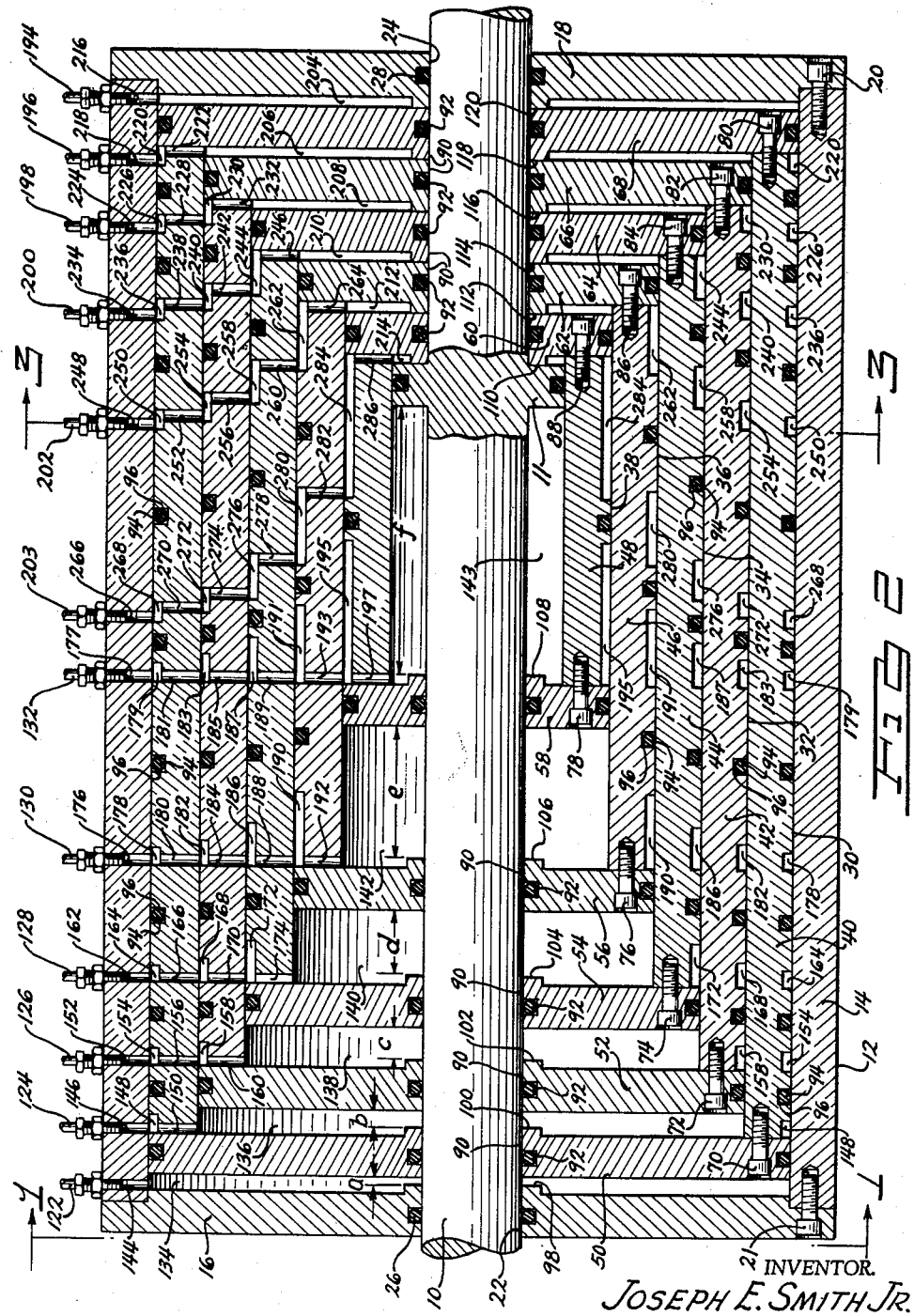

Dec. 17, 1963    J. E. SMITH, JR    3,114,296
LINEAR ACTUATOR
Filed March 23, 1961    4 Sheets-Sheet 3

INVENTOR.
JOSEPH E. SMITH JR.
BY
Bower & Patalidis
ATTORNEYS

Dec. 17, 1963  J. E. SMITH, JR  3,114,296
LINEAR ACTUATOR
Filed March 23, 1961  4 Sheets-Sheet 4
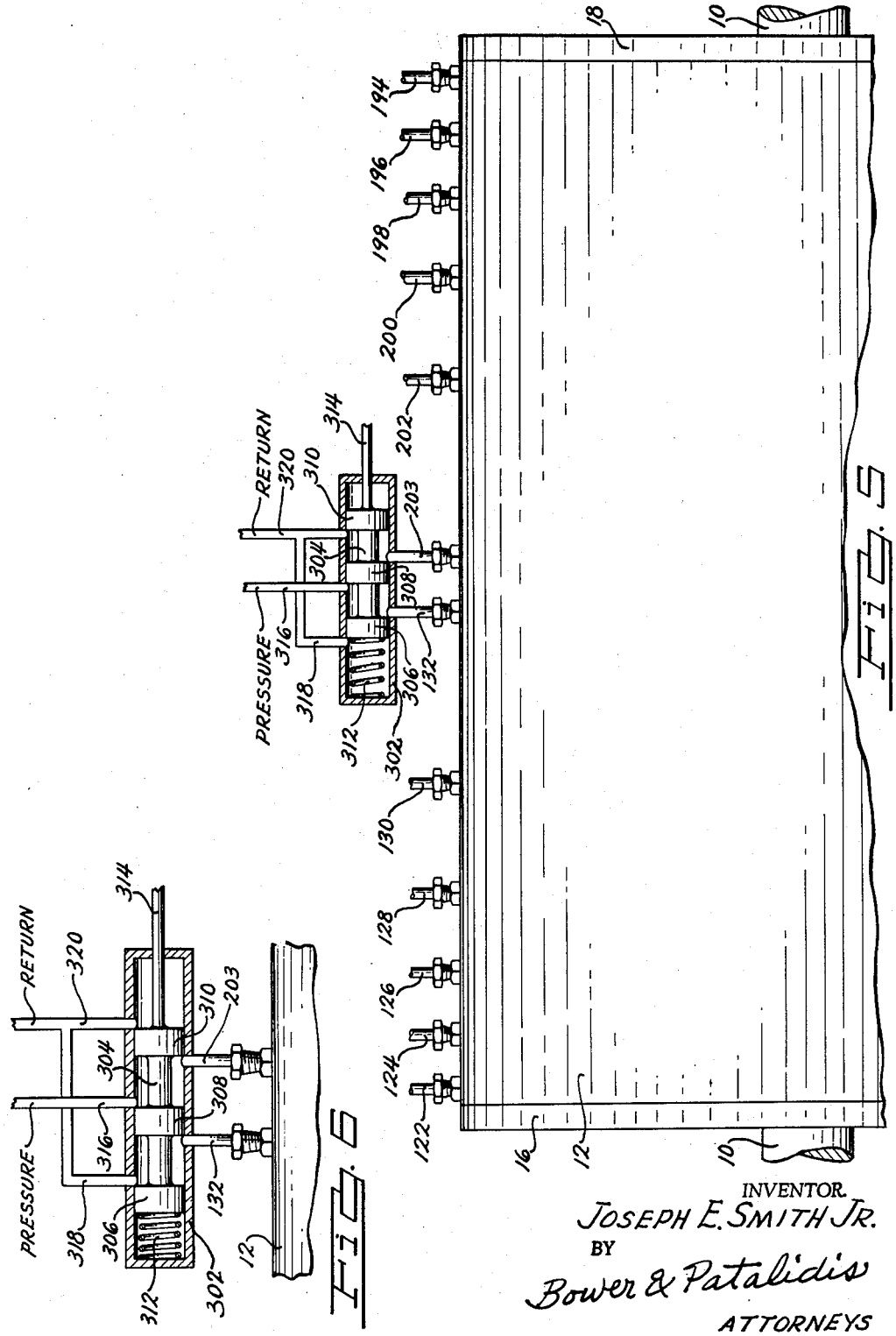
INVENTOR.
JOSEPH E. SMITH JR.
BY
Bower & Patalidis
ATTORNEYS United States Patent Office 3,114,296
Patented Dec. 17, 1963

3,114,296
LINEAR ACTUATOR
Joseph E. Smith, Jr., Birmingham, Mich., assignor to Ex-Cell-O Corporation, Detroit, Mich.
Filed Mar. 23, 1961, Ser. No. 97,928
17 Claims. (Cl. 91—169)

This invention relates to improvements in linear actuators, and more particularly relates to servo-mechanisms for linearly positioning a shaft by fluid means in response to selective input signals.

In the art of data processing, digital computers, machine tools, automation, and the like, there exists a need for devices which accurately position a shaft or a movable reference output element in response to information applied to the input of the device. Various servomechanisms of this nature have been proposed; they may be actuated by electrical means or by purely mechanical means. It is an object of this invention to provide a linear shaft actuator and positioner which is selectively operated by fluid pressure means. The fluid may be oil, water, compressed air, a gas, steam, or any other like fluid.

The transmission of control information in systems of the character herein mentioned is commonly carried out in the binary numerical system. It is frequently desirable to convert the digital representation of the binary number into an analogue equivalent, such as the linear position of a movable reference output element or an angular shaft rotation, as disclosed in U.S. Patent No. 2,911,956 of the same inventor, assigned to the same assignee as the present invention. It is, therefore, the object of this invention to provide selectively operable fluid motor means for converting a binary information into an analogue equivalent in the form of a linear shaft position. It is apparent to those skilled in the art that such an analogue linear displacement and positioning can be easily converted, in applications where so desired, into an angular shaft rotation and positioning through a simple rocker arm assembly, a rack and pinion assembly, or the like.

It is a further object of this invention to provide a compact, self-contained, fluid motor-powered binary-to-linear shaft position converter.

It is another object of this invention to provide a linear actuator utilizing a relatively small number of simple elementary identical parts in order to reduce manufacturing cost and inventory.

It is an additional object of this invention to provide a linear actuator developing a great power with practically no lag in operation and almost instantaneous response.

It is a further object of this invention to provide a linear actuator having a number of discrete positions which correspond to the formula $N=2^n$, which N denotes the number of discrete positions and $n$ denotes the number of individual unit elements being placed in parallel within a common housing. For example, if it is desired to provide for 8 different discrete positions of the output reference element, the number of unit elements or stages to be used is 3; if 128 discrete positions are required, 7 unit elements or stages must be placed within the housing.

A further object of this invention is to have a predetermined number of discrete positions which are accurately repeatable ad infinitum, together with positive indexing at each discrete position.

Still a further object of this invention is to provide a linear actuator which is compact and which can be utilized where space limitations impose the desirability of using a short apparatus.

An additional object of this invention is to provide a device which can utilize readily available pressure fluid hardware, tubings, valves, accumulators, and the like.

Another object is to provide a functional unit endowed with high reliability and long life.

Additional objects and advantages of the invention will become apparent from the following description and appended claims, taken in connection with the accompanying drawings, which disclose, by way of example, the principles of this invention and the best mode that has been contemplated of applying these principles.

In the drawings:

FIG. 1 is an end elevation view of a linear positioner embodying the principles of this invention, with portions broken away to show the internal configurations;

FIG. 2 is a longitudinal sectional view taken only along line 2—2 of FIG. 1, and showing the apparatus in its fully retracted position;

FIG. 3 is a sectional view taken along line 3—3 of FIG. 2;

Figure 4:
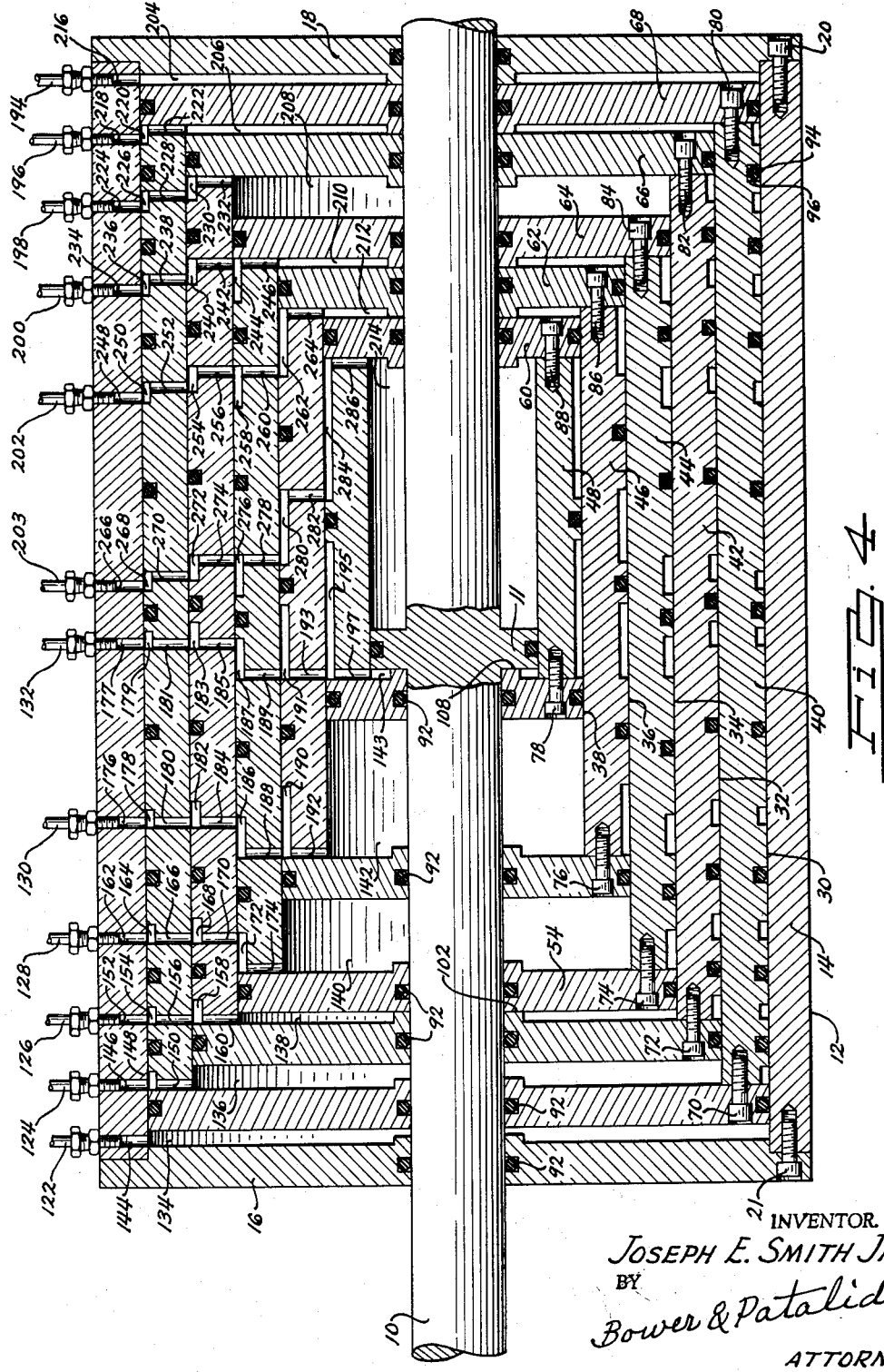
FIG. 4 is a longitudinal sectional view, similar to FIG. 2, but showing the apparatus in a partially extended position.

FIG. 5 is a partial side elevational view of the apparatus of FIGS. 1–4, representing in a schematic manner an example of one of the typical valves that may be used to control and operate the apparatus, said example of typical valve being shown in a position that controls the corresponding unit element or stage of the apparatus to a retracted position; and FIG. 6 is a schematic representation of the example of typical valve of FIG. 6, shown in the position that controls the corresponding unit element or stage to an extended position.

The invention consists in general of a cylindrical stationary housing in which are placed a plurality of concentric reciprocating elements, contained within one another. The innermost element encloses a double-acting reciprocating piston element which is an integral part of, or may be fastened to, an output shaft. Each element acts as a double-acting piston element in relation to its immediate enclosure element and is capable of limited travel therein. When, by selectively introducing fluid pressure into the appropriate chamber one such element is caused to travel, it carries with it all the elements contained therein, thus forcing the output shaft to travel the same amount. In the preferred example as illustrated, the individual elements are allowed a travel or stroke which is twice the travel or stroke of the element immediately surrounding it. In this fashion, with five elements combined concentrically within the outer housing, there are six piston-cylinder individual elements or motor stages resulting in sixty-four discrete positions available for the output shaft, from the fully retracted to the fully extended position.

Referring to the drawings, an output shaft indicated generally at 10 is designed to slidably reciprocate in and out of a cylindrical housing indicated generally at 12. The housing comprises a cylindrical shell 14 and two end caps 16 and 18 scured to the shell by means of cap screws, or the like, 20 and 21. The end caps are provided with bores 22 and 24, respectively, affording a passage for the output shaft 10, supplied with suitable seals 26 and 28 to seal the interior of the housing from the ambient. Within the housing and concentric to both the housing and the output shaft are disposed five concentric piston-cylinder elements or motor stages designed generally by numerals 30, 32, 34, 36 and 38. Each piston-cylinder element comprises in turn a cylindrical shell designated respectively by 40, 42, 44, 46 and 48, and two end caps 50—68, 52—66, 54—64, 56—62 and 51—60, secured to the shell by cap screws or the like 70, 80, 72, 82, 74, 84, 76, 86, 78 and 88. The end caps have, substantially in their center, a bore 90 adapted to accept the output shaft 10 and provided with suitable seals 92. The outermost shell is slidably mounted within the housing 12, and the other shells are slidably mounted within one another. They all have suitable seals 94 in grooves 96 on their outer cylindrical surface as shown.

Each end cap has an integral shoulder, disposed concentrically to the bore affording a passage to the shaft 10, that defines an abutment portion, such as 98, 100, 102, 104, 106, 108, 110, 112, 114, 116, 118, and 120 disposed towards the inside of the respective housing and cylinder elements. The overall length of piston-cylinder element 30 is arbitrarily chosen, in the example as shown, as being slightly shorter by a quantity $a$ than the space between the abutments 98 and 20 on the end caps of the housing. The overall length of piston element 32 is arbitrarily chosen to be shorter than the space between abutments 100 and 118 of cylinder element 30 by a quantity $b$ which is twice the value of $a$. Each successive concentric piston element has, in the same fashion, a possible travel or stroke within the cylinder immediately surrounding it, which is twice the value of the possible travel or stroke of that cylinder. Besides $a$ and $b$ already mentioned, these strokes are respectively $c$, $d$ and $e$ (FIG. 2). Integral with the shaft 10 is the double-acting piston element 11 adapted to slidably reciprocate within the cylinder 38 and having a possible stroke $f$, which is twice the value of stroke $e$.

A plurality of fluid inlet conduits 122, 124, 126, 128, 130 and 132 are provided on the housing 12 to place in fluid communication the retract chambers 134, 136, 138, 140, 142 and 143 to bias the output shaft to the right as shown in FIG. 2. Inlet conduit 122 leads directly into chamber 134 through passageway 144. Inlet conduit 121 leads into chamber 136 by means of the passageway 146 communicating with the annular groove 148 on the outer surface of the shell 40 of the piston-cylinder member 30. Annular groove 148 in turn communicates with chamber 136 by means of at least one passageway 150. Inlet conduit 128 places chamber 140 in fluid communication via passageway 162, annular groove 164 and passageway 166, annular groove 168 and passageway 170, and annular groove 172 and passageway 174. In the same fashion, inlet conduit 130 places chamber 142 in fluid communication via passageways 176, 180, 184, 188 and 192, and annular grooves 178, 182, 186 and 190. Inlet conduit 132 places chamber 143 in fluid communication through passageways 177, 181, 185, 189, and 193 leading into annular grooves 179, 183, 187, 191 and 195 respectively, and through passageway 197 leading into chamber 143.

In the position shown in FIG. 2, the device is in a fully retracted position. As indicated previously, fluid is admitted into retract chambers 134, 136, 138, 140, 142 and 143, forcing the right end caps of the cylinder elements, as shown, and the piston element 11 in contact with abutments 120, 118, 116, 114, 112 and 110, and defining the annular expand chambers 204, 206, 208, 210, 212 and 214. A plurality of fluid inlet conduits 194, 196, 198, 200, 202 and 203 are provided on the housing 12 to selectively place the expand chambers in communication with the source of pressure fluid by means of the passageways 216, 218, 222, 224, 228, 232, 234, 238, 242, 246, 248, 252, 256, 260, 264, 266, 270, 274, 278, 282 and 286 and of the annular grooves 220, 226, 230, 236, 240, 244, 250, 254, 258, 262, 268, 272, 276, 280 and 284.

The fluid inlet conduits are controlled in pairs, that is, when fluid, for example, is admitted to expand chamber 204 through conduit 194, fluid is exhausted from retract chamber 134 through conduit 122. In the same fashion, conduits 196 and 124, 198 and 126, 200 and 128, 202 and 130, 203 and 132 are selectively controlled together respectively, in order to actuate the device so that the output shaft 10 may be caused to be linearly displaced a predetermined distance in relation to the housing 12, according to the motor stage or motor stages being energized.

The pressurized fluid is admitted and exhausted from the appropriate expand and retract chambers by means of any two-way valves well known in the art. The valves may be manually controlled, or preferably, they may be electrically controlled by way of solenoids which are fed a coded parallel control signal in a binary form, as is also well known in the art.

FIGS. 5 and 6 represent an example of such a typical two-way valve, and it is evident that as many valves are required as there are motor stages in the linear actuator. In the example of actuator herein described and illustrated, having six stages, six two-way valves would be required, one valve being connected to fluid inlets 132 and 203, as shown in FIGS. 5 and 6, and five more similar valves connected to fluid inlets 130 and 202, 128 and 200, 126 and 198, 124 and 196, and 122 and 194 respectively (not shown). Describing the construction and operation of one such valve will suffice, as all the valves are similar in principle and operate in the same manner.

Each valve consists of a housing 302 containing a longitudinally slidable spool body 304 provided with three enlarged land portions 306, 308, and 310, and a control rod 314. Fluid inlet 132 communicating with retract chamber 143, and fluid inlet 203 communicating with expand chamber 214 (FIG. 2) lead into the housing 302 of the valve. A spring 132 normally biases the valve body 304 toward the right, as shown in the drawings, against an abutment or stop means (not shown) to the position indicated in FIG. 5. In this position, pressure conduit 316 is opened to the annular chamber between lands 308 and 310. In this manner, it can be seen that fluid inlet 132 is connected to pressure conduit 316, and fluid under pressure is present in retract chamber 143. Piston element 11 occupies the position shown in FIG. 2, as expand chamber 214 is connected to return passageway 320 via fluid inlet 203.

When valve spool control rod 314, which may be actuated by an electric solenoid (not shown), is actuated to displace the valve spool 304 to the position indicated in FIG. 6, fluid inlet 132 is connected to return conduit 318, thereby exhausing to return the fluid present in contract chamber 143. At the same time fluid inlet 203 being in communication with pressure conduit 316, pressurized fluid is introduced into expand chamber 214, thereby displacing piston element 11 and output shaft member 10 to the position of FIG. 6. All the motor stages are capable of being actuated by similar two-way valves operating in a similar manner, and by selective control of any particular combination of valves, the output shaft 10 is caused to occupy any discrete position corresponding to the motor stages being energized.

The position shown in FIG. 2 corresponds to position 0 (binary 000000). If, for example, fluid is admitted to expand chambers 208 and 214, at the same time as fluid is exhausted from retract chambers 138 and 143, the device will take the position indicated in FIG. 4. The piston-cylinder element 34 has now moved to the left of a distance $c$, until its end cap 54 contacts abutment 102, under the action of the fluid admitted to expand chamber 208 having exerted a pressure upon the end cap 64. At the same time, piston-cylinder element 34 has carried in its travel the piston-cylinder elements contained therein, namely, piston-cylinder elements 36, 38 and piston element 11, which are thus caused to travel the same distance $c$ as element 34. In a similar fashion, piston element 11 has been displaced to the left of a distance $f$ by the fluid exerting a pressure in expand chamber 214 until it contacts abutment 108. The output shaft 10 has travelled a distance $c+f$, and occupies now a position which is the analogue of 36 (binary 100100).

Similarly, if it is desired to cause the output shaft to occupy a position which is the analogue of 53 (binary 110101), the output shaft must move to a position which is the sum of the strokes $a$, $c$, $e$ and $f$. Pressure fluid is admitted into the expand chambers 204, 208, 212 and 214, and the retract chambers 134, 138, 142 and 143 are connected to exhaust.

With the number of elements as shown, the output shaft can occupy 64 discrete positions between position 0 (binary 000000) and position 63 (binary 111111). With one less element, the number of possible positions for the output shaft would be 32, and with one more element it would be 128. It is obvious that as many stages as desired can be used, and that, although the housing has been shown stationary and the output has been shown movable, this arrangement could be reversed. A pressure fluid biasing means has been shown in the preferred embodiment. It is evident that springs and the like could be used as biasing means.

It is to be noted that the volumetric capacity of each chamber is, or could be made, substantially the same for all the motor stages. This is due to the fact that, in the example of the invention as shown, the diameters of the chambers of each successive stage decrease at the same time as the strokes increase. The volume of fluid to be displaced remaining practically constant, therefore, the time necessary to displace the output shaft is practically the same whether it is displaced to a position corresponding to the stroke $a$, whether it is displaced to a position corresponding to the sum $a+b+c+d+e+f$ of all the strokes, or whether it is displaced to a position correspond to any other combination of individual strokes.

The most significant digit motor stage has been described as being connected directly to the output shaft, and the least significant, to the housing of the device. It is obvious that such an arrangement could be reversed and and that any other progression of, or relation between, the strokes of the different motor stages could be used without departing from the scope and spirit of the invention.

It is also obvious that various changes, additions and omissions of elements may be made in details within the scope and spirit of the invention and it is, therefore, to be understood that the invention is not to be limited to the specific details, example, and preferred embodiment shown and described.

What is claimed is:

1. A linear actuator comprising: A plurality of substantially concentric, cylindrical elements slidably disposed within each other, each of said cylindrical elements being closed on both ends by end caps having aligned bores disposed substantially along the common axis of said cylindrical elements; a shaft slidably movable through the bores; a shoulder on the shaft defining a piston element adapted to slidably fit within the inner diameter of the innermost of the cylindrical elements; means biasing the cylindrical elements and the shaft in one direction; means limiting the travel of each cylindrical element within the cylindrical element immediately surrounding it; means limiting the stroke of travel of the piston element within the innermost cylindrical element; pressure fluid means; conduit means selectively introducing the pressure fluid into the annular chamber defined by one end cap of any of the cylindrical element and the corresponding end cap of the cylindrical element immediately contained therein, whereby said immediately contained cylindrical element is caused to slidably and linearly travel a predetermined distance within the containing cylindrical element and to force the output shaft to linearly travel the same distance, and whereby the total travel of said output shaft is the sum of the travels of all the cylinder elements being actuated.

2. A device as claimed in claim 1 wherein the means limiting the travel of any cylinder element limits the travel of said cylinder element to a value which is twice the value of the travel of the cylinder element immediately surrounding said cylinder element.

3. A device as claimed in claim 1 wherein the means limiting the travel of any of the cylinder elements limits the travel of said cylinder element to a value which is one-half of the value of the travel of the cylinder element immediately surrounding said cylinder element.

4. A device as claimed in claim 1 wherein the biasing means comprises a pressure fluid means.

5. A linear actuator and positioner comprising: A plurality of substantially concentric cylindrical elements constituting a plurality of motor stages slidably disposed within each other, each of said cylindrical elements being closed on both ends by end caps having aligned bores for the passage of a common output shaft; a common output shaft reciprocally movable through the aligned bores; a shoulder on the shaft having a diameter adapted to slidably fit within the inner diameter of the innermost of the cylindrical elements and forming a double-acting piston element therein defining a retract annular chamber and an extend annular chamber; each of the cylindrical elements acting as a cylinder element for the cylindrical element immediately contained therein and as a double-acting piston element for the cylindrical element immediately surrounding said cylindrical ement; the annular space thus defined between the outer ends of the piston element and the inner ends of its cylinder element forming a retract chamber and an extend chamber; abutment means on the inner face of the end cap limiting the amount of linear travel of each piston element within the appropriate cylinder element; a source of pressure fluid; pressure fluid conduit means selectively introducing fluid into the retract chambers whereby the output shaft is biased to its retract position; pressure fluid conduit means selectively admitting fluid into the extend chambers to selectively cause the piston elements to be linearly displaced a distance allowed by the abutment means; means selectively exhausting the pressure fluid from the retract chambers while admitting pressure fluid to the extend chamber of the motor stages being actuated, whereby the total linear travel of the output shaft relatively to the outermost cylinder element is the sum of the individual linear travels of the motor stages being selectively actuated; and sealing means to seal the retract chambers from the extend chambers and the inside of said actuator and positioner from the ambient.

6. A linear actuator and positioner as claimed in claim 5 in which the pressure fluid conduit means comprise a plurality of passageways in the outermost cylinder element, the first and the last of said passageways leading respectively into the retract chamber and the extend chamber of the first motor stage; the second and the next to the last of the passageways leading into annular grooves on the outer cylndrical surface of the first piston element, said annular grooves being in communication with the retract chamber and the extend chamber of the second motor stage through at least one passageway respectively, and each of the other passageways in the outermost cylinder element leading into the retract chamber and the extend chamber of its respective motor stage by means of similar annular grooves on the piston elements and by means of the corresponding passageways.

7. A linear actuator and positioner as claimed in claim 5 in which the abutment means limiting the travel of a piston element within its corresponding cylinder element allows each piston element to move twice the linear distance of said cylinder element.

8. A linear actuator and positioner as claimed in claim 5 in which the abutment means limiting the travel of a piston element within its corresponding cylinder element allows each piston element to move one-half the linear distance of said cylinder element.

9. A linear actuator and positioner as claimed in claim 5 in which the position of the output shaft in relation to the outermost cylindrical element is the analogue equivalent of a binary number.

10. A linear actuator and positioner as claimed in claim 5 in which the outermost cylindrical element is maintained in a fixed position and the output shaft is allowed to be linearly movable in relation thereto.

11. A linear actuator and positioner as claimed in claim 5 in which the output shaft is maintained in a fixed position and the outermost cylindrical element is allowed to be linearly movable in relation thereto.

12. A linear actuator and positioner as claimed in claim 5 in which the volumetric fluid displacement of the expand and retract chambers of any motor stage is substantially equal to the volumetric fluid displacement of the expand and retract chambers of any other motor stage.

13. A linear actuator and positioner comprising in combination: a plurality of motor stage means slidably disposed substantially concentrically and capable of limited travel within each other; end caps closing each of the motor stage means on both ends thereof; aligned bores in the end caps along the common axis of the motor stage means; a shaft slidably movable through the aligned bores; means biasing the shaft in one direction; pressure fluid means; means selectively introducing the pressure fluid means to any number of the motor stages whereby said motor stages are energized; means causing the pressure fluid means to displace the shaft against the force of the biasing means of a quantity corresponding to the sum total of the travel of the individual motor stages.

14. A linear actuator and positioner as claimed in claim 13 in which the biasing means is a pressure fluid means.

15. A linear actuator and positioner as claimed in claim 13 in which the travel of any motor stage means is twice the travel of the motor stage immediately surrounding it.

16. A linear actuator and positioner as claimed in claim 13 in which the travel of any motor stage means is one-half the travel of the motor stage immediately surrounding it.

17. A linear actuator and positioner as claimed in claim 15 in which the linear position of the shaft represents the analogue equivalent of a binary number.

References Cited in the file of this patent

UNITED STATES PATENTS

| | | |
|---|---|---|
| 101,217 | Blake | Mar. 29, 1870 |
| 2,630,786 | Poore | Mar. 10, 1953 |
| 2,768,612 | Detamore et al. | Oct. 30, 1956 |
| 2,831,464 | Lillquist | Apr. 22, 1958 |